Oct. 19, 1937.　　　　J. S. STEWART　　　　2,096,207
WHEELED SCRAPER
Filed May 27, 1935　　　　3 Sheets-Sheet 1

INVENTOR
JAMES S. STEWART
BY
ATTORNEY.

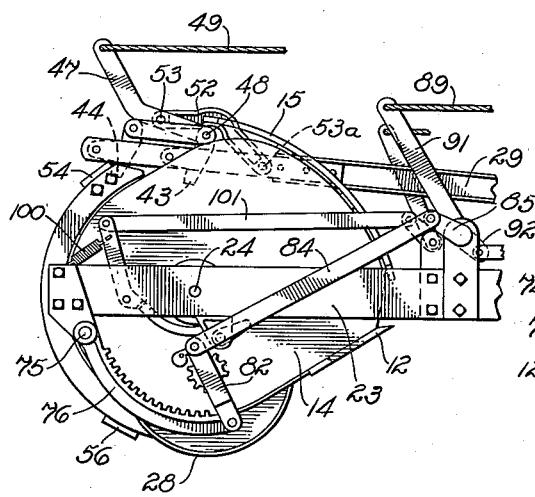
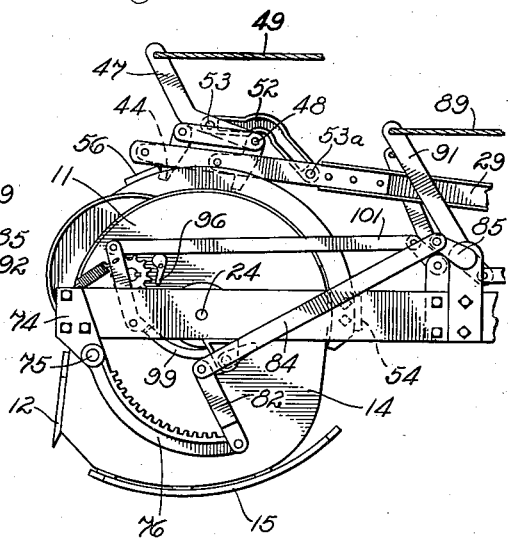
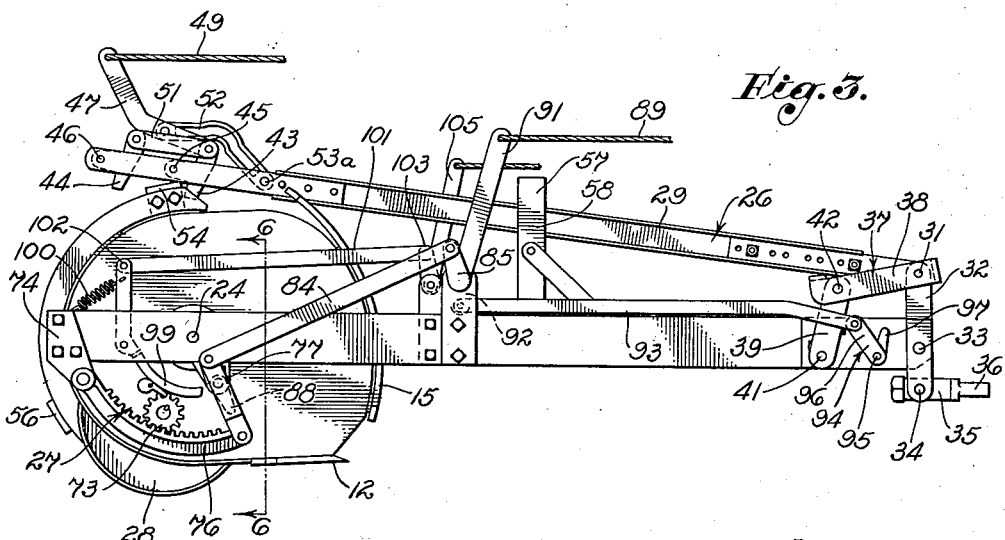

Oct. 19, 1937.  J. S. STEWART  2,096,207
WHEELED SCRAPER
Filed May 27, 1935   3 Sheets-Sheet 3

INVENTOR
JAMES S. STEWART
BY
ATTORNEY.

Patented Oct. 19, 1937

2,096,207

UNITED STATES PATENT OFFICE 2,096,207

WHEELED SCRAPER

James S. Stewart, Los Angeles, Calif., assignor to Atlas Scraper and Engineering Co., Los Angeles, Calif., a corporation of California Application May 27, 1935, Serial No. 23,639

19 Claims. (Cl. 37—140)

The invention relates in general to scrapers, and relates in particular to a scraper having wheels adapted to support the scraper bowl in raised position during such time as it may be desired to move the scraper with the scraper blade out of engagement with the ground.

It is an object of the invention to provide a wheeled scraper having a plurality of operating positions and a simple means, partly automatic in character, for producing the adjustment of the cooperating scraper parts into their various positions of operation.

It is a further object of the invention to provide a scraper of the above character which may be operated in ground-engaging position so as to pick up a load, and which has means whereby it may be automatically adjusted to what is termed "carrying position" with the bowl raised from the ground and tilted in such a manner that the load will not be spilled. The bowl has a blade which, under many conditions of operation, may be in engagement with and partly embedded in the soil at the time the bowl has become completely filled.

My invention provides a means which utilizes force exerted on the scraper to move the same for the still further purpose of forcibly disengaging the scraper blade from the soil so that it may be then rotated into a raised or carrying position. After the operation of this means for disengaging the blade from the soil, supplementary means which I have provided operate to rotate the bowl into the aforesaid carrying position, whereupon the scraper may be moved on its wheels to a location where it is desired to dump the load carried by the bowl.

An important object of the invention is to provide a means of simple character by which a large force may be exerted to disengage the scraper knife from the soil so as to positively produce an initial movement of the scraper bowl toward carrying position, and it is a further object of the invention to provide a means whereby the rolling of the wheels in engagement with the ground will complete the movement of the scraper bowl into carrying position.

A further object of the invention is to provide an automatic means for releasing the means for moving the bowl to carrying position when carrying position of the bowl has been reached, together with releasable means for locking the scraper bowl in carrying position.

A further object of the invention is to provide a means whereby the bowl may be caused to move to a discharge position in which the load will be spread in a layer over the ground, or whereby the bowl may be permitted to completely rotate so as to discharge the load in the form of a pile or mound.

A further object of the invention is to provide a wheeled scraper which may be moved forwardly or rearwardly upon the wheels thereof and which may be operated to discharge the bowl in rearward direction should it be desired to dump the load over an abutment or close to or against a wall.

It is a further object of the invention to provide a wheeled scraper in which the wheels are supported in compartments at the sides of the bowl, and which has means for locking the wheels from rotation, such means being disposed outside the lateral ends of the bowl so that they will not occupy space within the bowl, thereby making it possible to keep the size of the compartments at a minimum so that a maximum capacity of bowl may be maintained. In addition to this, the means for locking the wheels against rotation are disposed externally so that they can be readily controlled or actuated.

A further advantage of the present construction is that the locking means for the wheels are adapted to be selectively actuated, and the wheels are normally left free to rotate forwardly or rearwardly in order that the scraper may be rolled forwardly or rearwardly into the position at which it may be desired to dump the load.

A further object of the invention is to provide a simple control means and mechanism for accomplishing the functions hereinabove set forth.

Further objects and advantages of the invention will be made evident throughout the following part of the specification.

Referring to the drawings, which are for illustrative purposes only,

Fig. 3 is a side view similar to Fig. 2, but showing the scraper blade in partly raised position.

Fig. 4 is a fragmentary side view showing the scraper bowl in carrying position.

Fig. 5 is a fragmentary side view showing the scraper bowl in spreading position.

Figure 1:
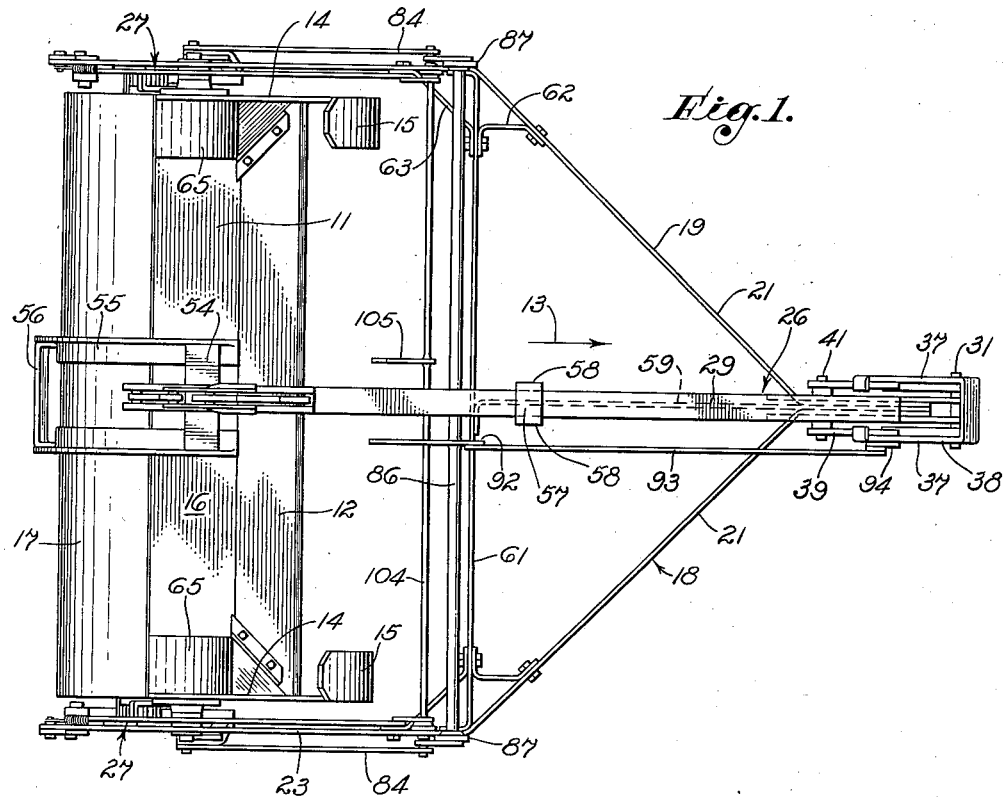
Fig. 1 is a plan view of a preferred embodiment of my invention.
Figure 2:
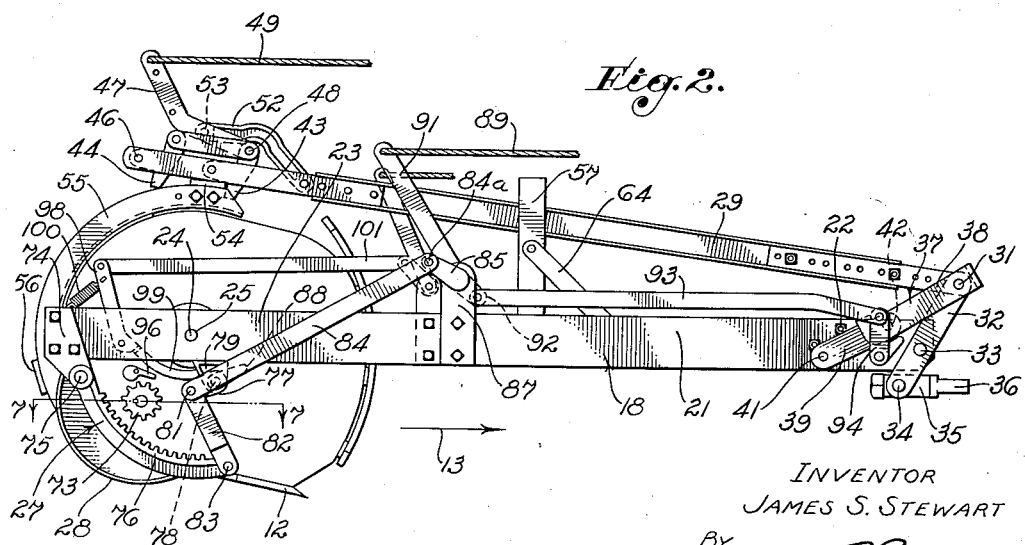
Fig. 2 is a side view corresponding to Fig. 1.

In the form of my invention shown in the drawings, I employ a scraper bowl 11 having a scraper blade or knife 12 which operates to pick up a load when the scraper is moved in the forward direction indicated by the arrow 13 in Figs. 1 and 2. The bowl 11 is provided with walls 14 which will be hereinafter referred to as side walls for the reason that they lie at the sides with respect to the direction of movement of the scraper indicated by the arrow 13. These side walls 14 are preferably of oval outline, as best shown in Fig. 2, and have arcuate runners 15 secured to the forward edges thereof. Leading rearwardly or leftwardly from the blade 12, the bowl 11 has a metal wall 16 which curves upwardly to form a back 17 for the scraper bowl, the lateral edges of the wall 16 being secured to the side walls 14.

For moving the bowl 11, a draft means 18 is provided, this draft means including a frame 19 consisting of a pair of flat frame members 21 which are joined together at their forward, or rightward, ends by the use of bolts 22 and which diverge rearwardly or leftwardly and are then bent rearwardly along the sides of the bowl 11 so as to form forks 23. For connecting the bowl 11 to the draft means 18 so that the bowl may rotate on a lateral axis, I provide pivot means consisting of trunnions 24 which project laterally from the side walls 14 through suitable openings 25 in the forks 23 of the frame 19.

In Fig. 2 I have shown the scraper bowl in operating or scraping position, in which the blade 12 thereof is lowered so as to engage the soil or material which is to be picked up by the scraper. At the time a full load is accumulated in the scraper bowl 11, or at such other time as it may be desired to discontinue the scraping operation, the blade 12 may be embedded in or engaging the soil so that such embedment or engagement will resist lifting of the blade. It is a feature of my invention to provide primary means 26 for initially applying a heavy force to rotate the bowl 11 so as to carry the blade 12 into partly raised position as shown in Fig. 3, together with auxiliary or supplementary means 27 for producing rotation of the bowl 11 into a position such as shown in Fig. 4, in which the blade 12 will be fully raised and the bowl 11 will then rest on wheels 28 which will support the scraper bowl and will permit the same to be rolled to any desired location for the dumping or spreading of the load carried by the scraper bowl 11. When such dumping location is reached, the bowl 11 may be caused to rotate in clockwise direction into the position in which it is shown in Fig. 5, wherein the blade 12 is spaced from the ground and will then serve to spread the load as the bowl 11 is slid forwardly on the runners 15 which are at this time directed downwardly so as to engage the ground. Further means and manners of dumping the load from the scraper bowl 11 will be set forth hereinafter.

The releasable means 26 includes a bar 29, the forward end of which is connected by a pivot 31 to the upper end of a fulcrum lever 32 which is connected by means of a lateral pin or bolt 33 to the forward end of the frame 19. The lower end of the fulcrum lever 32 is pivotally connected at 34 to a swivel member 35 having a bar 36 extending forwardly, or rightwardly, therefrom for engagement with a pulling means, such as a tractor. The members 35 and 36 may be termed a draft element through which a pulling force is applied to the scraper in such a manner that this pulling force will accomplish beneficial effects in addition to the mere pulling of the scraper, namely, the initial raising of the scraper blade 12 from scraping position with ample force to positively disengage the blade 12 from the ground or material in which it is embedded, thereby positively producing a start in the movement of the scraper bowl toward its carrying position shown in Fig. 4. The fulcrum lever 32 is releasably held in the forward position in which it is shown in Fig. 2 by toggles 37, each of which consists of links 38 which swing upon the pivot means 31, and links 39 which have their lower ends connected to a pivot pin 41 carried by the frame 19 near the forward end thereof. The pairs of links 38 and 39 are connected together by pivot pins 42.

In straightened position, as shown in Fig. 2, the toggles 37 resist rearward swinging movement of the fulcrum lever 32 under force applied through the draft connection or bar 36, but when the toggles 37 are broken, or collapsed, as shown in Fig. 3, the pull through the draft connection 36 may forcibly rotate the fulcrum lever 32 in rearward or anti-clockwise direction into the position in which it is shown in Fig. 3, this movement of the fulcrum lever 32 being transmitted to the bar 29 and causing the same to move rearwardly from the position in which it is shown in Fig. 2 to its position of Fig. 3. It is this rearward, or leftward, movement of the bar 29 which directly accomplishes the rotation of the scraper bowl 11 from its position of Fig. 2 to the position in which it is shown in Fig. 3. At the leftward end of the bar 29, dogs or pawls 43 and 44 are pivotally mounted on laterally extending pins 45 and 46. Normally the pawls 43 and 44 project below the bar 29, but they may be retracted upwardly by use of a lever 47 which is pivotally connected at 48 to the upper portion of the forward pawl 43 and is adapted to be swung upwardly and forwardly from the position in which it is shown in Figs. 2 and 3 by use of a rope 49 which extends forwardly from the upper end of the lever to the pulling vehicle to which the scraper is connected by means of the draft bar 36. The upper ends of the pawls 43 and 44 are connected together by means of a link 51 so that they will swing upwardly and downwardly in unison on their respective pivots 45 and 46. The lever 47 is pivotally connected at 53 with a link 52 which is in turn pivotally connected to the bar 29 at 53a.

When the scraper is in normal scraping position, the toggles 37 are straightened out so that the bar 29 is in its forward position shown in Fig. 2, and the forward dog or pawl 43 engages a stop which is formed on the scraper bowl 11 by a cross bar 54 which is secured to the upper ends of angle members 55 which in turn curve downwardly over and are secured to the rear wall or back 17 of the bowl 11. The engagement of the stop 54 with the pawl 43, as shown in Fig. 2, prevents forward rotation of the bowl 11 and maintains the bowl 11 in such position that the blade 12 thereof will be in scraping position. Should it be desired to dump the scraper bowl 11 from its scraping position shown in Fig. 2, all that is necessary is to pull forwardly on the rope 49, whereupon the movement of the lever 47 will be transmitted through the link 52 to the pawls 43 and 44, lifting the pawl 43 from engagement with the stop 54 to permit the scraper bowl 11 to rotate forwardly or in anti-clockwise direction. By holding the lever 47 forwardly, the scraper bowl 11 may be caused to pass through a complete revolution. Should the operator, however, desire to stop the scraper bowl in the spreading position in which it is shown in Fig. 5, he may release the lever 47 so that the pawl 44 will drop into engagement with a stop 56 consisting of a bar secured across the lower ends of the angle members 55. The material carried in the scraper bowl will then be forced to pass under the lower edge of the blade 12 in the position thereof shown in Fig. 5, the material being thereby discharged or spread in the form of a layer upon the surface across which the scraper is being dragged.

To hold the bar 29 in operative alignment, a guide 57 is provided, this guide consisting of a pair of vertical bars 58 spaced apart laterally to provide a space in which the bar 29 may move longitudinally and in which space the bar may have a limited vertical movement. The lower ends of the guide bars 58 are secured to a horizontal frame member 59 which extends forwardly from a lateral frame member 61 to the point or apex formed by the diagonal portions 21 of the frame 19 which forms the essential part of the draft means 18. The frame 19 may be suitably reinforced by the use of corner braces 62 and 63 as shown in Fig. 1, and the guide 57 may be reinforced in vertical position by the use of diagonal braces such as shown at 64 in Fig. 2.

Figure 7:
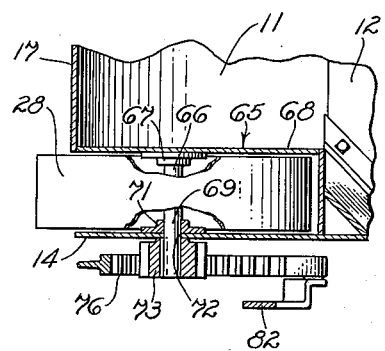
Fig. 7 is a fragmentary sectional view taken as indicated by the line 7—7 of Fig. 2, showing the manner of mounting the wheels of the scraper within the housings thereof.

In the form of the invention shown, there are preferably two wheels 28 each of which is carried in a wheel housing 65 formed adjacent each side plate 14 of the scraper bowl 11. As shown in Fig. 7, each wheel 28 is fixed upon a shaft 66, one end of which is carried in a bearing member 67 mounted on the inner wall 68 of the wheel housing, and the other end 69 of which shaft projects through a bearing 71 carried by a side plate 14 and through an opening 72 in such side wall, to have a gear 73 mounted thereon adjacent the outer face of the side wall 14. This gear is fixed upon the shaft 66 so that it will rotate with the wheel 28. The position of the gear 73 is eccentric to the axis of rotation of the scraper bowl 11 defined by the trunnions 24, and when the bowl 11 is in scraping position as shown in Fig. 2, the gear 73 is below and to the rear of the axis of rotation defined by the trunnions 24 so that the wheel 28 associated therewith is in a position ready for engagement with the ground when the bowl 11 is rotated in anti-clockwise direction in response to the breaking of the toggles 37 and the consequent rearward movement of the bar 29.

Figure 6:
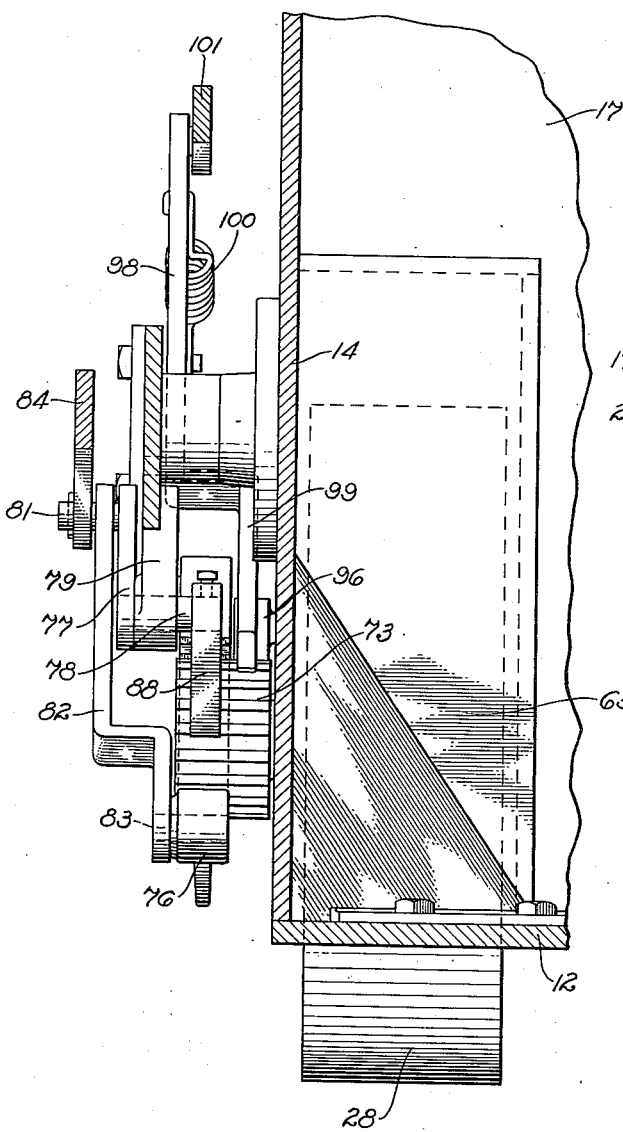
Fig. 6 is an enlarged fragmentary section taken as indicated by the line 6—6 of Fig. 3.

A bracket 74 on the rearward, or leftward, end of each fork 23 carries a pin 75 to which an arcuate rack 76 is pivotally secured so as to be swingable from a position such as shown in Fig. 2, wherein it is out of engagement with the gear 73 intended to cooperate therewith, into a position of engagement with such gear, as shown in Fig. 3. As shown in Fig. 6, the rack 76 is of such width, and is so placed, that it will engage the outer portion of the gear 73 and will be spaced away from the outer face of the cooperating side wall 14 of the scraper bowl 11. For accomplishing movement of the rack 76 between the positions in which it is shown in Figs. 2 and 3, a short lever 77 is pivotally carried by a bolt or shaft 78 which projects laterally through a bracket 79 which projects downwardly from a fork 23 in a position slightly forward of the adjacent trunnion 24. A pivot pin 81 at the outer end of the lever receives the upper end of a link 82 which has its lower end connected by means of a pivot 83 to the forward end of the arcuate rack 76. An actuating link 84 also connects to the pivot pin 81 and extends forwardly and upwardly to a pivot member 84a carried by a crank 85 which is mounted on an end of a cross shaft 86 which is in turn carried by brackets 87 on the frame 19.

In the practice of the invention it is preferable to use a gear 73 at each side of the scraper bowl and to employ duplicate parts 74 to 87 as shown, so that the racks 76 will be operated to and from engagement with the gears 73 in unison.

Secured to the inner end of each pin or shaft 78 is a releasing lever or dog 88 which, as shown in Fig. 6, lies in the same plane as the rack 76 adjacent thereto. When the lever 77 is positioned as shown in Fig. 2, the dog 88 points forwardly, as shown in dotted lines, and when the lever 77 is swung into upwardly facing position, as shown in Figs. 3 and 6, the dog 88 faces downwardly into the path which will be traversed by the gear 73 as the scraper bowl rotates in anti-clockwise direction.

The operation of the scraper bowl from scraping position, as shown in Fig. 2, to carrying position, as shown in Fig. 4, is accomplished in the following manner: By use of a rope 89 which extends forwardly to the pulling vehicle, a lever 91 is swung forwardly from the position in which it is shown in Fig. 2 to the position in which it is shown in Fig. 3. This lever 91, being secured to the shaft 86, causes the same to rotate and carry the crank 85 into raised position as shown in Fig. 3, whereby a similar rotation will be imparted to the lever 77 to move the link 82 upwardly and thereby carry the rack 76 associated therewith into engagement with the adjacent gear 73. At the same time the rotation of the shaft 86 will transmit motion through a short lever 92 mounted thereon to a link 93 which extends forwardly to a releasing means 94 which is pivoted at 95 to the forward portion of the frame 19, such releasing means 94 comprising a lever 96 from which a dog or finger 97 extends in a position to engage the lower portion of the toggles 37 and to cause the toggles to collapse, when the releasing means 94 is swung from its position of Fig. 2 to the position in which it is shown in Fig. 3. Therefore, substantially simultaneously with the raising of the rack 76 into engagement with the gear 73, the toggles 37 will be collapsed so that the bar 29 may swing rearwardly in response to the pull which is exerted forwardly on the lower end of the lever 32 by the draft connection 36. The force transmitted leftwardly through the bar 29 is sufficient to positively rotate the bowl 11 from the position in which it is shown in Fig. 2 to its position of Fig. 3. The wheels 28 will be now positively in engagement with the ground so as to roll in clockwise direction as the scraper is moved forwardly. The rotation of the wheels is transmitted to the gears 73 which are then caused to travel along the racks 76 and to rotate the bowl 11 from its position of Fig. 3 to the position in which it is shown in Fig. 4, so that the stop 54 will move back into latching position relative to the second pawl 44. At this time the gears 73 will have moved into engagement with the downwardly projecting dogs 88, causing them to rotate in anti-clockwise direction and positively rotating the levers 77 into the rearwardly and downwardly extending position indicated in Fig. 2, thereby lowering the links 82 and the racks 76 into the positions in which they are also shown in Fig. 4. The bowl 11 will now be held in upwardly tilted or carrying position by the engagement of the dog 54 with the pawl 44, and the scraper may be wheeled about as desired, thereby making it possible to transport the scraper with its load to a desired dumping location without any parts thereof dragging on the ground. When the dumping location has been reached, the rope 49 may be pulled so as to raise the lever 47 and retract the latches or pawls 43 and 44, permitting the bowl to rotate forwardly.

My invention also provides means which may be actuated to produce a rotation of the bowl in rearward direction. As shown in Fig. 2, a latch dog 96 is pivoted adjacent each gear 73 and against the outer surface of a side wall 14 of the scraper bowl. Each latch member 96, as shown in Fig. 2, has its rearward end counterweighted so that such latch member 96 will be normally held from engagement with its associated gear 73 and accordingly will not interfere with the rotation of the gear in either direction. When it is desired to cause the bowl 11 to rotate in rearward direction, the latch members 96 are moved into engagement with the gears 73 so as to lock the wheels 28 against anti-clockwise rotation so that rearward force applied to the bowl 11 will cause the same to pivot rearwardly over the stationary wheels and thereby discharge its load in rearward direction. To selectively cause engagement of the latch members 96 with the gears 73, I pivot levers 98 on the rearward portions of the forks 23. Each of the levers 98 has a curved portion 99 which extends over and adjacent the outer face of the end wall 14 carrying the latch member 96 which is to be actuated. Springs 100 normally hold the levers 98 in retracted position so that the curved portions 99 thereof will not engage the latches 96, but the levers 98 may be moved forwardly from the positions in which they are shown in Fig. 2 to the positions thereof shown in Fig. 3, through the use of links 101 which extend forwardly from pivot means 102 at the upper ends of the levers 98 to cranks 103 mounted on a cross bar 104 which carries an operating lever 105. Accordingly, when the lever 105 is pulled forwardly into the position in which it is shown in Fig. 3, motion will be transmitted through the links 101 to the levers 98, causing these levers 98 to rotate in clockwise direction and swing the curved portions 99 thereof downwardly so as to force the latches 96 into engagement with the gears 73. It will be noted that the latches are so placed that the gears 73 may at all times rotate in clockwise direction. If clockwise rotation of the gears 73 takes place while the latches 96 are held in engagement therewith as shown in Fig. 3, the latches will be forced upwardly by the teeth of the gears 73, and the levers 98 will be forced to rotate rearwardly against such pull as may be exerted on the handle 105, this taking place without breakage of any parts owing to the relative positions of the members 73, 96, and 99.

Although I have herein shown my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A wheeled scraper of the character described, including: a bowl; draft means for said bowl; pivot means connecting said bowl to said draft means; wheels mounted on said bowl in eccentric relation to said pivot means; releasable means utilizing the draft force applied to said draft means to initially raise the forward portion of said bowl from engagement with the ground; and means operated by the forward rolling movement of said wheels to further raise the forward portion of said bowl.

2. A wheeled scraper of the character described, including: a bowl; draft means for said bowl; pivot means connecting said bowl to said draft means; wheels mounted on said bowl in eccentric relation to said pivot means; releasable means utilizing the draft force applied to said draft means to initially raise the forward portion of said bowl from engagement with the ground; lift means operated by the forward rolling movement of said wheels to further raise the forward portion of said bowl; lock means for holding said bowl in raised position; and means to release said lift means when said bowl is in position for engagement with said lock means.

3. A wheeled scraper of the character described, including: a bowl; draft means for said bowl; pivot means connecting said bowl to said draft means; wheel means mounted on said bowl in eccentric relation to said pivot means; releasable means utilizing the draft force applied to said draft means to initially raise the forward portion of said bowl from engagement with the ground; a gear driven by the rolling of said wheel means in engagement with the ground; a rack member carried by said draft means so as to be moved into engagement with said gear whereby said gear will traverse said rack member and produce rotation of said bowl on said pivot means to further lift the forward portion of said bowl; and means for controlling the position of said rack member relative to said gear.

4. A wheeled scraper of the character described, including: a bowl; draft means for said bowl; pivot means connecting said bowl to said draft means; wheel means mounted on said bowl in eccentric relation to said pivot means; releasable means utilizing the draft force applied to said draft means to initially raise the forward portion of said bowl from engagement with the ground; a gear driven by the rolling of said wheel means in engagement with the ground; a rack member carried by said draft means so as to be moved into engagement with said gear whereby said gear will traverse said rack member and produce rotation of said bowl on said pivot means to further lift the forward portion of said bowl; means for controlling the position of said rack member relative to said gear; and a releasable lock for holding said bowl with the forward end thereof in lifted position after it has been lifted by said gear and said rack member.

5. A wheeled scraper of the character described, including: a bowl; draft means for said bowl; pivot means connecting said bowl to said draft means; wheel compartments formed in said bowl; a wheel in one of said compartments having a shaft projecting through the end of said bowl; a gear member mounted on the projecting end of said shaft; a rack member mounted on said draft means so as to be movable into engagement with said gear member, whereupon rotation of said gear member will cause said bowl to rotate on said pivot means into a carrying position; and means to hold said bowl in said carrying position.

6. A wheeled scraper of the character described, including: a bowl; draft means for said bowl; pivot means connecting said bowl to said draft means; wheel compartments formed in said bowl; a wheel in one of said compartments having a shaft projecting through the end of said bowl; means utilizing the draft force, exerted on said draft means for moving said scraper, to initially rotate said bowl; a gear member mounted on the projecting end of said shaft; a rack member mounted on said draft means so as to be movable into engagement with said gear member, whereupon rotation of said gear member will cause said bowl to rotate on said pivot means into a carrying position; and means to hold said bowl in said carrying position.

7. A wheeled scraper of the character described, including: a bowl; draft means for said bowl; pivot means connecting said bowl to said draft means; wheel compartments formed in said bowl; a wheel in one of said compartments having a shaft projecting through the end of said bowl; a gear member mounted on the projecting end of said shaft; a rack member mounted on said draft means so as to be movable into engagement with said gear member, whereupon rotation of said gear member will cause said bowl to rotate on said pivot means into a carrying position; manually controlled means for moving said rack member into engagement with said gear member; and means to hold said bowl in said carrying position.

8. A wheeled scraper of the character described, including: a bowl; draft means for said bowl; pivot means connecting said bowl to said draft means; wheel compartments formed in said bowl; a wheel in one of said compartments having a shaft projecting through the end of said bowl; means utilizing the draft force, exerted on said draft means for moving the scraper, to initially rotate said bowl; a gear member connected to the outer end of said shaft so as to be rotated thereby; a rack member mounted on said draft means so as to be movable into engagement with said gear member, whereupon rotation of said gear member by said wheel will cause said bowl to rotate on said pivot means into carrying position; manually controlled means for moving said rack member into engagement with said gear member; means for automatically disengaging said rack member from said gear member when said bowl has approximated carrying position; and releasable means for holding said bowl in said carrying position.

9. A wheeled scraper of the character described, including: a bowl; draft means for said bowl; pivot means connecting said bowl to said draft means; wheel compartments formed in said bowl; a wheel in one of said compartments having a shaft projecting through the end of said bowl; means utilizing the draft force, exerted on said draft means for moving the scraper, to initially rotate said bowl; a gear member connected to the outer end of said shaft so as to be rotated thereby; a rack member mounted on said draft means so as to be movable into engagement with said gear member, whereupon rotation of said gear member by said wheel will cause said bowl to rotate on said pivot means into carrying position; manually controlled means for moving said rack member into engagement with said gear member; means for automatically disengaging said rack member from said gear member when said bowl has approximated carrying position; releasable means for holding said bowl in said carrying position; and means for locking said gear member against rotation.

10. A wheeled scraper of the character described, including: a bowl; draft means for said bowl; pivot means connecting said bowl to said draft means; wheel compartments formed in said bowl; a wheel in one of said compartments having a shaft projecting through the end of said bowl; means utilizing the draft force, exerted on said draft means for moving the scraper, to initially rotate said bowl; a gear member connected to the outer end of said shaft so as to be rotated thereby; a rack member mounted on said draft means so as to be movable into engagement with said gear member, whereupon rotation of said gear member by said wheel will cause said bowl to rotate on said pivot means into carrying position; means for controlling the position of said rack member relative to said gear member; and means for locking said gear member against rotation.

11. A scraper of the character described, including: a scraper bowl having a forwardly directed cutting edge for engagement with the ground, and pivot members at the sides thereof; a draft member connected to said bowl through said pivot members so that said bowl may rotate in a direction to swing said cutting edge upwardly from engagement with the ground; a draft element for connection to a motivating means whereby a force may be applied to said draft element; a fulcrum lever connected to said draft element and to said draft member; releasable means for preventing rotation of said fulcrum lever under the force exerted thereon by said draft element; force transmitting means operative when said releasable means is actuated to transmit a force from said fulcrum lever to said bowl to initially rotate the same in a direction to lift said cutting edge from engagement with the ground; lifting means separate from said force transmitting means operative upon forward movement of the scraper to further lift said cutting edge thereof; and a control member operative to simultaneously release said releasable means and actuate said lifting means.

12. A scraper of the character described, including: a scraper bowl having a forwardly directed cutting edge for engagement with the ground, and pivot members at the sides thereof; a draft member connected to said bowl through said pivot members so that said bowl may rotate in a direction to swing said cutting edge upwardly from engagement with the ground; a draft element for connection to a motivating means whereby a force may be applied to said draft element; a fulcrum lever connected to said draft element and to said draft member; releasable means for preventing rotation of said fulcrum lever under the force exerted thereon by said draft element; force transmitting means operative when said releasable means is actuated to transmit a force from said fulcrum lever to said bowl to initially rotate the same in a direction to lift said cutting edge from engagement with the ground; means separate from said force transmitting means and operating during forward movement of said scraper for continuing the rotation of said bowl into a carrying position; and latch means for holding said bowl in said carrying position, said latch means comprising a part fixed to said bowl and a movable part carried by said draft member.

13. A scraper of the character described, including: a scraper bowl having a forwardly directed cutting edge for engagement with the ground, and pivot members at the sides thereof; a draft member connected to said bowl through said pivot members so that said bowl may rotate in a direction to swing said cutting edge upwardly from engagement with the ground; a draft element for connection to a motivating means whereby a force may be applied to said draft element; a fulcrum lever connected to said draft element and to said draft member; releasable means for preventing rotation of said fulcrum lever under the force exerted thereon by said draft element; force transmitting means operative when said releasable means is actuated to transmit a force from said fulcrum lever to said bowl to initially rotate the same in a direction to lift said cutting edge from engagement with the ground; supplementary lift means separate from said force transmitting means and controllably connected to said releasable means, said supplementary lift means operating during forward movement of said scraper and when said releasble means is actuated to continue the rotation of said bowl into carrying position; and latch means for holding said bowl in said carrying position.

14. A scraper of the character described, including: a scraper bowl having a forwardly directed cutting edge for engagement with the ground, and pivot members at the sides thereof; a draft member connected to said bowl through said pivot members so that said bowl may rotate in a direction to swing said cutting edge upwardly from engagement with the ground; a draft element for connection to a motivating means whereby a force may be applied to said draft element; a fulcrum lever connected to said draft element and to said draft member; a collapsible toggle connected so as to prevent rotation of said fulcrum lever when it is in extended condition; a wheel mounted on said bowl; a gear connected so as to be driven by said wheel; a rack movably connected to said draft member so as to be moved to and from engagement with said gear, the driving of said gear in engagement with said rack producing rotation of said bowl into carrying position; manually operated means for simultaneously moving said rack into engagement with said gear and collapsing said toggle; and means connecting said fulcrum lever to said bowl so that the movement of said lever upon the collapse of said toggle will exert a force to initiate the rotation of said bowl toward carrying position.

15. A scraper of the character described, including: a scraper bowl having a forwardly directed cutting edge for engagement with the ground, and pivot members at the sides thereof; a draft member connected to said bowl through said pivot members so that said bowl may rotate in a direction to swing said cutting edge upwardly from engagement with the ground; a draft element for connection to a motivating means whereby a force may be applied to said draft element; a fulcrum lever connected to said draft element and to said draft member; a collapsible toggle connected so as to prevent rotation of said fulcrum lever when it is in extended condition; a wheel mounted on said bowl; a gear connected so as to be driven by said wheel; a rack movably connected to said draft member so as to be moved to and from engagement with said gear, the driving of said gear in engagement with said rack producing rotation of said bowl into carrying position; manually operated means for simultaneously moving said rack into engagement with said gear and collapsing said toggle; means connecting said fulcrum lever to said bowl so that the movement of said lever upon the collapse of said toggle will exert a force to initiate the rotation of said bowl toward carrying position; a latch for holding said bowl in said carrying position; and means engageable by said gear as said bowl moves into carrying position for returning said manually operated means to its original state.

16. A scraper of the character described, including: a scraper bowl having a forwardly directed cutting edge for engagement with the ground, and pivot members at the sides thereof; a draft member connected to said bowl through said pivot members so that said bowl may rotate in a direction to swing said cutting edge upwardly from engagement with the ground; a draft element for connection to a motivating means whereby a force may be applied to said draft element; a fulcrum lever connected to said draft element and to said draft member; a collapsible toggle connected so as to prevent rotation of said fulcrum lever when it is in extended condition; a wheel mounted on said bowl; a gear connected so as to be driven by said wheel; a rack movably connected to said draft member so as to be moved to and from engagement with said gear, the driving of said gear in engagement with said rack producing rotation of said bowl into carrying position; manually operated means for simultaneously moving said rack into engagement with said gear and collapsing said toggle; and a bar extending rearwardly from said fulcrum lever to said bowl, said bar having means engaging said bowl so that the movement of said lever upon the collapse of said toggle will exert a force to initiate the rotation of said bowl toward carrying position.

17. A scraper of the character described, including: a scraper bowl having a forwardly directed cutting edge for engagement with the ground, and pivot members at the sides thereof; a draft member connected to said bowl through said pivot members so that said bowl may rotate in a direction to swing said cutting edge upwardly from engagement with the ground; a draft element for connection to a motivating means whereby a force may be applied to said draft element; a fulcrum lever connected to said draft element and to said draft member; a collapsible toggle connected so as to prevent rotation of said fulcrum lever when it is in extended condition; a wheel mounted on said bowl; a gear connected so as to be driven by said wheel; a rack movably connected to said draft member so as to be moved to and from engagement with said gear, the driving of said gear in engagement with said rack producing rotation of said bowl into carrying position; manually operated means for simultaneously moving said rack into engagement with said gear and collapsing said toggle; and a bar extending rearwardly from said fulcrum lever to said bowl, said bar having releasable latch means engaging the upper part of said bowl so that the movement of said lever upon the collapse of said toggle will exert a force to initiate the rotation of said bowl toward carrying position.

18. A wheeled scraper of the character described, including: a bowl; draft means for said bowl; pivot means connecting said bowl to said draft means; wheel means mounted on said bowl in position to engage the ground; stop means engageable to prevent rotation of said wheel means; means normally holding said stop means disengaged: and a control member for engaging said stop means.

19. A wheeled scraper of the character described, including: a bowl; draft means for said bowl; pivot means connecting said bowl to said draft means; a wheel compartment formed in said bowl; a wheel in said compartment having a shaft projecting through one end of said bowl; locking means operative to engage the end of said shaft and prevent rotation of said wheel when it is desired to dump said bowl rearwardly; means normally holding said locking means in disengaged position; and means for operating said locking means to engage said shaft whereby said bowl may be caused to rotate rearwardly on said wheel and discharge said bowl in rearward direction.

JAMES S. STEWART.